2,986,496

PRODUCTION OF ANTIBIOTICS AND ANTI-
BIOTIC-CONTAINING PRODUCTS

Alan Rhodes, Bracknell, and Derek L. Fletcher, Stoke
Poges, England, assignors to Glaxo Laboratories Lim-
ited, Greenford, England, a British company No Drawing. Filed Jan. 2, 1957, Ser. No. 631,993

Claims priority, application Great Britain, Jan. 5, 1956

11 Claims. (Cl. 195—80)

This invention is concerned with improvements in or relating to the production of antibiotics and antibiotic-containing products. More specifically it relates to the production of the antifungal antibiotic griseofulvin, and of griseofulvin-containing preparations, especially such preparations as are suitable for use in horticulture or agriculture in the form of for example dusts, sprays and the like.

Griseofulvin is a known antibiotic, which has important antifungal properties, and which may be represented by the following formula:

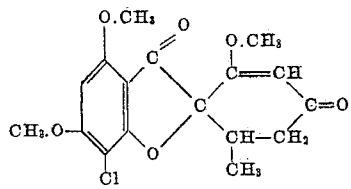

Its large-scale production by submerged aerobic fermentation, and its isolation and purification from the fermentation broth are described in copending applications Serial No. 573,621, filed March 26, 1956, and Serial No. 582,927, filed May 7, 1956, both assigned to the assignee of the present application. In copending application Serial No. 592,270, filed June 19, 1956, and also assigned to the assignee of the present application, there are also described compositions adapted to be used particularly in agriculture, which compositions contain griseofulvin.

One of the principal uses of griseofulvin is in agriculture and horticulture for the treatment of plant diseases; for this purpose therefore it is necessary that the antibiotic be produced cheaply and in large quantities. The methods of extraction hitherto proposed have all been based upon the separation of mycelium from the culture broth after fermentation, followed by extraction of the antibiotic therefrom. The separated antibiotic has then been incorporated into agricultural dusts or sprays by admixture with suitable carriers.

Following upon our discovery that griseofulvin can be produced in high titre by submerged fermentation we now find advantages can be secured by simply drying the mycelium, and preferably the whole broth, by a roller drying technique. The dried material so obtained can then be used directly for agricultural or horticultural purposes without any further treatment except possibly simple grinding or milling.

The present invention is based upon the use of griseofulvin containing culture broths from griseofulvin producing fermentation and having a griseofulvin titre of at least 0.5 g./litre and preferably of at least 1.0 g./litre and such broths are called "high potency broths"; the potency here referred to is the total titre of the whole broth including both antibiotic present in the liquid and that present in the mycelium. In practising our invention we take a high potency broth and subject it to roller-drying; for this purpose we may first separate the mycelium from the broth and dry the mycelium, or alternatively and more conveniently we may dry the whole broth.

In the fermentation of griseofulvin-producing organisms, most of the antibiotic is retained in the mycelium until nearly the end of the fermentation, so that it is possible to stop the fermentation just before mycelial break-down takes place, and separate the mycelial solid which will be found to contain substantially the whole of the griseofulvin. At the point at which mycelial breakdown takes place however the total titre is normally found to be still rising quite substantially, but the advantage of this fact has hitherto been offset by reason of the difficulty of extracting the antibiotic from a culture in which substantial mycelial breakdown has taken place. If however the process of the present invention is used, then one may without difficulty roller-dry the whole broth, after the occurrence of mycelial break-down, thus taking advantage of the still rising titre when mycelial break-down starts; in addition of course the roller drying of the whole broth obviates the necessity of filtering the mycelium from the broth.

According to the invention therefore, we provide a method of producing a griseofulvin containing material which comprises roller drying a high potency griseofulvin containing broth (as herein defined).

According to a feature of the invention we provide a method of producing a griseofulvin containing material from a high-potency griseofulvin containing broth obtained by the submerged fermentation of a griseofulvin-producing organism in a suitable culture medium, in which the mycelium of said griseofulvin producing organism containing a substantial proportion of the total griseofulvin present is separated from the broth, and roller dried.

The material derived from the roller drying is in the form of a flaky powder which contains in general at least 3% of griseofulvin and maybe as much as 8%. This material may be milled or ground to suitable particle size and used directly as, or in, an agriculural or horticultural dust. Of course other ingredients may be added such as wetting and sticking agents and these may with advantage be added to the fermentation broth after fermentation but before drying, thus ensuring even distribution. The powder can of course be formulated so as to give a material which can be suspended or emulsified in water or oil to form a spray.

Quite apart from the fact that the present invention provides a material which, if necessary after grinding or milling, can be directly applied, and which can be prepared in one single stage from the fermentation broth, the product also has the advantage that the griseofulvin is evenly distributed throughout it, and that all the particles are of substantially the same bulk density. As will be well recognised these two features are of great importance in an agricultural dust, particularly if it is to be applied on a large scale by mechanical distribution.

The roller dried material produced according to the invention is also of value in the preparation of purified forms of griseofulvin, e.g. the crystalline material. The roller-dried material thus may conveniently be extracted with suitable solvents, for example in a manner similar to that described in the aforesaid co-pending applications, and the antibiotic recovered in any convenient way. Such a procedure presents advantages as compared with the methods of isolation hitherto employed, particularly where the whole broth is dried since no stop of filtering off the mycelium is then necessary, and advantage can be taken of the increased titres obtainable by culturing beyond the point of mycelial breakdown.

It should be noted that the use of a roller-drying technique is essential to the present process, and that other drying techniques such as spray-drying are not satisfactory owing particularly to the gelatinous nature of the broth. Furthermore, for both economic and practical reasons the process can be applied only to high potency broths obtained by submerged fermentation. A broth obtained by surface culture would be unsatisfactory since firstly the titre would be insufficient to make the process economically worthwhile and secondly the coherent gelatinous nature of a surface culture would not give a material which would be so satisfactory for direct use in an agricultural product.

The roller-drying treatment can be carried out in any convenient way, the principles of roller drying being in general well known in other arts. The mycelium or whole broth is thus applied in a thin film to a heated drum or roller, for example by passage either between the drum and an adjacent doctor blade or through the nip of a pair of drums or rollers. Moisture is removed from the film by evaporation, and the dried solids are then crumbled and removed from the heated drum by means of a further doctor blade pressing thereon. Many different kinds and sizes of roller-drying apparatus are available for use, the choice being governed mainly by the scale of operations contemplated and general convenience.

Both the wet mycelial solid obtained from a griseofulvin fermentation, for example by string discharge filtration, and the whole fermentation broth can be roller-dried very satisfactorily, to yield a solid of pale buff, free flowing, pleasant smelling, dried flakes.

These roller-dried solids are obtained cheaply and with a very high over-all griseofulvin efficiency, e.g. frequently over 95% from harvest broth to roller-dried solid. From the standpoint of pure griseofulvin production, roller-drying whole broth overcomes the necessity for harvesting the fermentation while the mycelium is still suitable for string-discharge filtration. These roller-dried griseofulvin solids are, moreover, very suitable for the preparation of many agricultural and pharmaceutical products.

The potency of the dried solid obtained according to the invention will depend upon various factors such as the strain of organism used, the nature of the medium and the conditions of fermentation; in general however, as stated above the dried solid will be found to contain from 3–8% of griseofulvin.

The dry flaky pulverulent nature of the roller-dried solids obtained according to the invention, which as stated, frequently contain as much as 95% or more of the griseofulvin-potency of the whole broth readily lends itself without further processing to the application thereto of solvent extraction techniques of any suitable kind, for example such as have been described in the aforesaid co-pending application Ser. No. 573,621. By such means it has been found possible to achieve an overall efficiency of griseofulvin-extraction of approximately 80% of the potency of the whole broth, or even higher. While this overall percentage rate of extraction is generally similar to that achieved by the methods we have previously employed, it must be remembered that use of the process of roller-drying of the whole broth according to the present invention permits the fermentation itself to be continued beyond the point of mycelial breakdown, so that the actual net yield of griseofulvin is in such cases noticeably increased.

It is therefore a feature of this invention to provide a process for the production of substantially pure griseofulvin in which a griseofulvin-producing organism is cultured in a suitable medium under submerged aerobic conditions, preferably beyond the point of mycelial breakdown, to yield a fermentation broth of high potency, the mycelium and preferably the whole fermentation broth is then harvested and subjected to a roller-drying treatment to yield a flaky pulverulent solid product, which latter is then subjected to any suitable solvent extraction technique for the isolation of griseofulvin therefrom.

The extraction techniques employed may conveniently be those described in our aforesaid co-pending applications, the solvents used being for example trichlorethylene or chloroform. The roller-dried griseofulvin broth solids can in this way be conveniently extracted to yield approximately 80% pure griseofulvin. This material can then be purified to yield crystalline griseofulvin.

The mycelial residue remaining after the solvent extractions may still contain a small proportion of unextracted griseofulvin, and is therefore particularly useful, after drying and comminution if required to bring it to the necessary particle size, as a diluent or carrier for agricultural or medical dusts, dispersible powders, sprays or the like, particularly of course such dusts et cetera as already contain or are to be enriched with griseofulvin.

The substantially pure griseofulvin yielded by the solvent extraction of the roller-dried solids may of course be used in any application for which griseofulvin is suitable; for example it may be formed into liquid concentrates and compositions in e.g. N,N'-dimethylformamide as has been described in the aforesaid application Ser. No. 592,270. It may also of course be mixed, and if necessary ground, with any suitable inert filler, diluent or carrier, including the extracted and comminuted mycelial solids previously mentioned, to yield antifungal dusts et cetera of any desired potencies, e.g. 1.5%, 3%, 10%.

As stated above, for the purpose of forming griseofulvin-containing products such as agricultural or horticultural dusts, powders, sprays and the like it is cheaper and more convenient to omit the step of isolating pure griseofulvin from the roller-dried whole broth and merely to grind up or otherwise comminute the roller-dried solids to the required particle size. To this finely-ground griseofulvin-containing powder can if desired be added further quantities of either diluent or pure griseofulvin, according to the potency of the product it is wished to obtain. The resultant powder can be used directly as horticultural or agricultural dust, or it can form the basis of more complex formulations designed for particular agricultural applications; these formulations may for example include suitable wetting agents such as Nansa HS flake, dispersing agents, fillers such as china clay and magnesium trisilicate, and sticking agents.

The roller-dried solid grinds well to give excellent dusts of uniform density, having potencies of about 3–8% (w./w.) griseofulvin. The particle size that can be obtained on processing is almost infinitely variable and can thus be adjusted to suit various uses. In general, however, we prefer to grind the roller dried solid to a particle size of less than 200 microns. We have, for example, micronised these solids satisfactorily to give particles less than 10 microns with more than 90% of the particles below 5 microns.

These dusts have the outstanding merit that all particles (both active ingredients and diluents) are roughly of the same size and density. When applied in the field there is therefore no fear that the two types of particles will become segregated.

The addition of suitable wetting-out agents, dispersing agents and fillers in the preparation of wettable or dispersible powders can be done either before roller-drying or during blending and grinding of the dried solids, though the former is usually preferable so as to ensure thorough distribution throughout the dried solids. We also find that the roller-dried griseofulvin solids, when ground to small particle size, can be intimately mixed with a suitable wetting-out agent, either with or without addition of protective colloids, to give a stock paste, or stock dispersion. Nansa HS flake is for example a suitable wetting-out agent for any of the above purposes. All these products, roller-dried dusts, wettable and dispersible powders, and sprays, are non-phytotoxic for a wide range of plants.

It should be noted that the roller-dried product obtained according to the invention itself provides a satisfactory nutrient source for the growth of certain micro-organisms including bacteria not affected by griseofulvin. In the interests of stability it is therefore desirable to incorporate in products based upon the roller-dried material some substance having anti-bacterial properties. As is known, many wetting agents of the alkylaryl sulphonate type, e.g. Nansa HS flake, possess such bacteriostatic properties, and such substances when added to products based on the roller-dried material serve the dual purpose of acting as both wetting and anti-bacterial agent. Alternatively, of course, some other non-phytotoxic and compatible anti-bacterial agent may be used.

In order that the invention shall be fully understood some examples of its various aspects will now be given, by way of illustration only:

ROLLER DRYING OF GRISEOFULVIN MYCELIAL SOLIDS

Example 1

325 litres of fermentation broth (obtained as described in application Ser. No. 573,621) with a titre of 1205 mcg./ml. were filtered on a string discharge filter to give 81 kilograms of wet mycelial solid with a moisture content of 76.4% and containing by the spectrophotometric assay (described in that application) 270 grams of griseofulvin.

22 kilograms of this mycelium were roller dried on a Simon experimental roller drier, the rollers of which were 8" long and 8" in diameter, with a distance of $10/1000"$ between the rollers. The machine was operated at 1.9 r.p.m. and steam at 60 p.s.i.g. was used for heating. The dried solid (moisture content 6.4%) was obtained as pleasant smelling, pale buff, free flowing flakes, weighing 4.33 kilograms. By spectrophotometric assay this material contained 86 grams of griseofulvin, showing that there was no destruction or loss of the antibiotic. As a check 200 grams of the material were extracted with trichlorethylene and yielded 4 grams of 80% pure griseofulvin prior to re-crystallisation.

Example 2

From 120 litres of a typical fermentation broth with a titre of 2725 mcg./ml., 12 kilograms of a wet mycelial solid having a moisture content of 80.7% and a fat content of 3.34% were obtained by string discharge filtration of the broth. By using the spectrophotometric assay this solid was found to contain 180 grams of griseofulvin. The mycelial solid was roller dried as before to give 2.7 kilograms of pale buff, free flowing, pleasant smelling dried flakes, which had a moisture content of 9.7% and a fat content of 11.9%.

The dried material contained by assay 190 grams of griseofulvin (i.e. 7.2%), as determined by the spectrophotometric assay. As a check 240 grams of the dried mycelium were extracted to give 15 grams of griseofulvin 92% pure prior to recrystallisation.

ROLLER DRYING OF GRISEOFULVIN BROTHS

Example 3

40 litres of a typical fermentation broth assaying at 3,445 mcg./ml. were roller dried on the Simon experimental roller drier, the gap between the rollers being $10/1000"$. The machine was operated at 1.3 r.p.m. and steam at 60 p.s.i.g. was used for heating. The dried solid was obtained as pleasant smelling, pale buff, free flowing flakes (density 0.29), weighing 2,870 grams, and containing by assay 5.1% griseofulvin, 8.0% moisture, 8.8% fat.

Example 4

To 1 lot of 20 litres of typical whole broth assaying at 2,140 mcg./ml. were added 9.1 g. Nansa HS flake, and the broth roller dried to give 950 g. of a dried product containing by assay 48.6 g. of griseofulvin, 4.5% fat, 6.5% moisture. Another 20 litre lot of exactly similar broth was roller dried on the Simon experimental roller dryer using 60 p.s.i.g. steam for heating, and running at 1.3 r.p.m. to give 800 g. of a dried product containing by assay 44.8 g. of griseofulvin, 5.6% fat, 6.0% moisture.

GRINDING OF ROLLER DRIED GRISEOFULVIN WHOLE BROTH

Example 5

40 grams of a typical roller dried whole broth containing by assay 5.0% griseofulvin, 8.0% moisture, 8.8% fat, were ground in a Mikro-Pulverizer, running at 15,000 r.p.m., and using the $10/1000"$ sieve to give 38 grams of a light brown dust, or felt, containing by assay 5.6% griseofulvin, 8.1% fat, 9.8% moisture.

All below 10 microns and 90% below 5 microns.

PREPARATION OF SPRAYS FROM ROLLER-DRIED GRISEOFULVIN WHOLE BROTH

Example 6

1 g. of Nansa HS flake was mixed to a cream with water. This was then added gradually, with further rinsings, to 8.8 g. of micronised felt prepared as in Example 5 (90% particles below 5 microns and rest below 10 microns), and ground in a pestle and mortar. Total water used=20 mls. The result was a thick cream. This cream or paste mixture of griseofulvin and Nansa HS flake could be used commercially if stabilised with a bactericide.

On dilution of the stock paste with water to 1 litre, a good uniform dispersion, suitable for an agricultural spray was obtained. Contents of diluted spray were 440 mcg. of griseofulvin per millilitre, and 0.05% of wetting agent.

PREPARATION OF AGRICULTURAL DUSTS

Example 7

50 lbs. of roller-dried griseofulvin felt (griseofulvin content 4.46% w./w.) were ground in Kek spinning-disc and Britten roller grinding machines and then mixed with similarly ground china clay diluent to give 150 lbs. of final dust with a griseofulvin content of approximately 1.5% sieve analysis of the finished dust gave the following figures:

| | Percent |
|---|---|
| Retained on British Standard Mesh No. 100 | 5 |
| Retained on British Standard Mesh No. 200 | 14.4 |
| Retained on British Standard Mesh No. 300 | 10 |
| Passed on British Standard Mesh No. 300 | 70.6 |

This dust was suitable for agricultural use, and was non-phytotoxic on antirrhinum, tomato, tobacco and cucumber plants.

Example 8

80 lbs. of roller-dried griseofulvin whole broth (griseofulvin content 3.2% w./w.) and 64 lbs. of roller-dried griseofulvin whole broth previously extracted with trichloroethylene (griseofulvin content negligible) were ground in a Kek spinning-disc and Britten roller grinding machines, and then mixed to give approximately 140 lbs. of a griseofulvin foliage dust, containing approximately 2.2% griseofulvin (w./w.).

Sieve analysis of the finished dust gave the following figures:

| | Percent |
|---|---|
| Retained on British Standard Mesh 200 | 10 |
| Retained on British Standard Mesh 300 | 40 |
| Passed on British Standard Mesh 300 | 50 |

This dust was suitable for agricultural use, and was non-phytotoxic on antirrhinum, tomato, tobacco and cucumber plants.

USE OF ROLLER-DRIED GRISEOFULVIN AS AN ANTIFUNGAL DUST FOR PLANTS

Example 9

A 3% (w./w.) griseofulvin dust was prepared by diluting the roller-dried griseofulvin felt with china clay as previously described in Example 7, and the dust was used in commercial trials against *Botrytis cinerea* (grey mould) on lettuce grown either in heated glasshouses or in unheated glasshouses, cloches or Dutch lights.

The procedure adopted was to dust the seedlings immediately after emergence and to repeat at intervals of approximately one month up to time of picking.

Results assessed in terms of plants lost by disease were as follows:

Heated houses: Percentage loss
(1) Trial A—
  Untreated plots: lost (due to Botrytis) __ 11.7
  23.4
  Griseofulvin felt plots: lost _____ 4.0
  5.3
(2) Trial B—
  Untreated plots: lost _____ 6.7
  7.0
  Griseofulvin felt plots: lost _____ 3.5
Unheated houses and cloches:
(1) Trial C (cloches)—
  Untreated plots: lost _____ 47.5
  52.5
  Griseofulvin felt plots: lost _____ 5.0
  8.0
(2) Trial D (cold house)—
  Untreated plots: lost _____ 16.5
  15.2
  Griseofulvin felt plots: lost _____ 8.0
  6.7

We claim:

1. A method of producing a solid griseofulvin-containing material, comprising: applying a thin film of a material selected from the group consisting of a whole high-potency, griseofulvin-containing broth obtained by submerged fermentation and the mycelia separated from such a broth to the surface of a heated roller; evaporating moisture from said film to produce a dry, solid material; and removing said dry material from the surface of said roller.

2. A method as claimed in claim 1 in which said broth has a titre of at least 0.5 g./litre of griseofulvin.

3. A method as claimed in claim 1 in which said broth has a titre of at least 1.0 g./litre of griseofulvin.

4. A method as claimed in claim 1 in which a wetting agent is added to said broth.

5. A method of producing a solid griseofulvin-containing material, comprising: culturing beyond the point of mycelial breakdown a griseofulvin-producing organism under submerged aerobic conditions in a culture medium which will support the growth of said organism, to obtain a high-potency, griseofulvin-containing broth; applying a thin film of the whole broth to the surface of a heated roller; evaporating moisture from said film to produce a dry, solid material; and removing said dry material from the surface of said roller.

6. A method as claimed in claim 5 in which a wetting agent is added to said broth.

7. A method of producing a solid griseofulvin-containing material, comprising: culturing a griseofulvin-producing organism under submerged aerobic conditions in a culture medium which will support the growth of said organism to produce a mycelium-containing broth; separating moist griseofulvin-containing mycelium from said broth; applying a thin film of said moist mycelium to the surface of a heated roller; evaporating moisture from said mycelium to produce a dry, solid material; and removing said dry, solid material from the surface of said roller.

8. A method as claimed in claim 7 in which a wetting agent is added to said separated moist mycelium.

9. A method as claimed in claim 7 in which the culturing of said organism is stopped prior to mycelial breakdown.

10. A method for the preparation of griseofulvin, comprising: applying a thin film of a material selected from the group consisting of a whole high-potency griseofulvin-containing broth obtained by submerged fermentation and the mycelia separated from such a broth to the surface of a heated roller; evaporating moisture from said film to produce a dry, solid material; removing said dry material from the surface of said roller; and extracting griseofulvin from said dry material with a solvent for griseofulvin.

11. A method as claimed in claim 10 in which said solvent is selected from the group consisting of trichloroethylene and chloroform.

References Cited in the file of this patent

UNITED STATES PATENTS 2,643,213    Hall _____ June 23, 1953
2,681,881    Bennett _____ June 22, 1954

OTHER REFERENCES

Grove: Nature, vol. 160, October 25, 1947, page 574.
Brian: Brit. Myco. Soc. Trans., vol. 32, part 1, 1949, pp. 30–33.
Perry: Chemical Engineer's Handbook, 3rd ed., 1950, McGraw-Hill Book Co., pp. 863–866.
Baron, Handbook of Antibiotics, Reinhold Pub. Co., N.Y., 1950, pp. 136–138.
Brian: Nature, March 3, 1951, pp. 347–349.
Henry et al.: Plant Disease Reporter, August 1953, 461.
Brian: J. of Applied Bact., 1954, vol. 17, pp. 142–151.
Phytopathology, vol. 46, August 1956, pp. 466–470 (presented March 12, 1956).